United States Patent
Chen et al.

(10) Patent No.: US 10,412,299 B2
(45) Date of Patent: Sep. 10, 2019

(54) TAKING PERSONALIZED PHOTOS

(71) Applicant: INTERNATIONAL BUSINESS MACHINES CORPORATION, Armonk, NY (US)

(72) Inventors: Yan Chen, Beijing (CN); Wei Li, Shanghai (CN); Kun Peng Wang, Shanghai (CN); Wanfei Yan, Shanghai (CN); Wen Bao Yin, Shanghai (CN); You Miao Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 50 days.

(21) Appl. No.: 15/712,216

(22) Filed: Sep. 22, 2017

(65) Prior Publication Data

US 2019/0098204 A1   Mar. 28, 2019

(51) Int. Cl.
    *H04N 5/232*   (2006.01)

(52) U.S. Cl.
    CPC ..... *H04N 5/23219* (2013.01); *H04N 5/23216* (2013.01)

(58) Field of Classification Search
    CPC .................. H04N 5/23219; H04N 5/23216
    See application file for complete search history.

(56) References Cited

U.S. PATENT DOCUMENTS

| | | | |
|---|---|---|---|
| 9,843,727 B2 * | 12/2017 | Mishio | H04N 5/772 |
| 2013/0057713 A1 * | 3/2013 | Khawand | H04N 5/232 |
| | | | 348/208.1 |
| 2013/0258133 A1 * | 10/2013 | Nakagawa | H04N 5/23229 |
| | | | 348/222.1 |
| 2014/0104483 A1 * | 4/2014 | Kunishige | H04N 5/23212 |
| | | | 348/349 |
| 2016/0134803 A1 | 5/2016 | Deng | |

(Continued)

FOREIGN PATENT DOCUMENTS

| CN | 204362124 U | 5/2015 |
|---|---|---|
| CN | 105979147 A | 9/2016 |

(Continued)

OTHER PUBLICATIONS

Yeh et al., "Virtual Portraitist: Aesthetic Evaluation of Selfies Based on Angle", MM'14, Nov. 3-7, 2014, pp. 221-224.

(Continued)

*Primary Examiner* — Shahbaz Nazrul
(74) *Attorney, Agent, or Firm* — Arnold B. Bangali

(57) ABSTRACT

The present disclosure relates to a method and system for taking photos. According to another embodiment of the present invention, there is provided a system. The system includes an electronic device having a camera. The electronic device is configured to determine an object to be taken by the camera. Then the electronic device is configured to determine at least one shooting parameter for the object based on at least one previous photo related to the object. The electronic device is further configured to cause a setting of the camera to be adjusted based on the at least one shooting parameter. According to a further embodiment of the present invention, there is provided a computer program product. The computer program produce is tangibly stored on a non-transient machine-readable medium and include machine-executable instructions.

19 Claims, 8 Drawing Sheets

(56) References Cited

U.S. PATENT DOCUMENTS

2016/0191434 A1* 6/2016 Rice .................. H04L 51/38
                                                  709/204
2016/0337492 A1   11/2016 Tseng
2018/0247419 A1*  8/2018 Lee ................... G06T 7/246
2018/0302553 A1* 10/2018 Weng ............. H04N 5/23222

FOREIGN PATENT DOCUMENTS

CN     106060398 A    10/2016
CN     106101539 A    11/2016
WO     2016197788 A1  12/2016

OTHER PUBLICATIONS

Mell et al., "The NIST Definition of Cloud Computing", Recommendations of the National Institute of Standards and Technology, NIST Special Publication 800-145, Sep. 2011, 7 pages.

* cited by examiner

TAKING PERSONALIZED PHOTOS

BACKGROUND

The present invention relates to image capturing, and more specifically, to a method and system for facilitating taking photos based on shooting parameters. Nowadays, many people are fond of taking photos, especially selfie photos. When taking photos, people usually need to take several factors into consideration to obtain a satisfactory picture.

SUMMARY

According to one embodiment of the present invention, there is provided a method implemented at an electronic device having a camera. In operation, an object to be taken by the camera is determined. Then at least one shooting parameter for the object is determined based on at least one previous photo related to the object. Further, a setting of the camera is caused to be adjusted based on the at least one shooting parameter.

According to another embodiment of the present invention, there is provided a system. The system includes an electronic device having a camera. The electronic device is configured to determine an object to be taken by the camera. Then the electronic device is configured to determine at least one shooting parameter for the object based on at least one previous photo related to the object. The electronic device is further configured to cause a setting of the camera to be adjusted based on the at least one shooting parameter.

According to a further embodiment of the present invention, there is provided a computer program product. The computer program produce is tangibly stored on a non-transient machine-readable medium and include machine-executable instructions. When the instructions are executed on an electronic device having a camera, the instructions cause the electronic device to determine an object to be taken by the camera. Then the instructions cause the electronic device to determine at least one shooting parameter for the object based on at least one previous photo related to the object. Further, the instructions cause the electronic device to cause a setting of the camera to be adjusted based on the at least one shooting parameter.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figure 1:
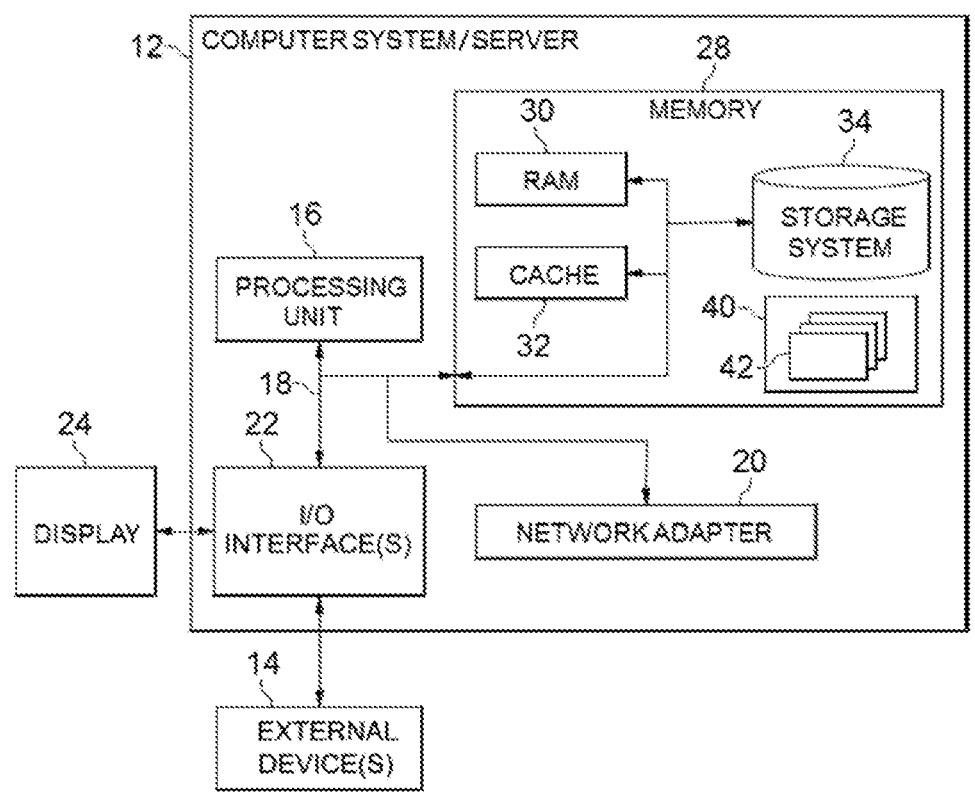
FIG. 1 depicts a cloud computing node according to an embodiment of the present invention.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
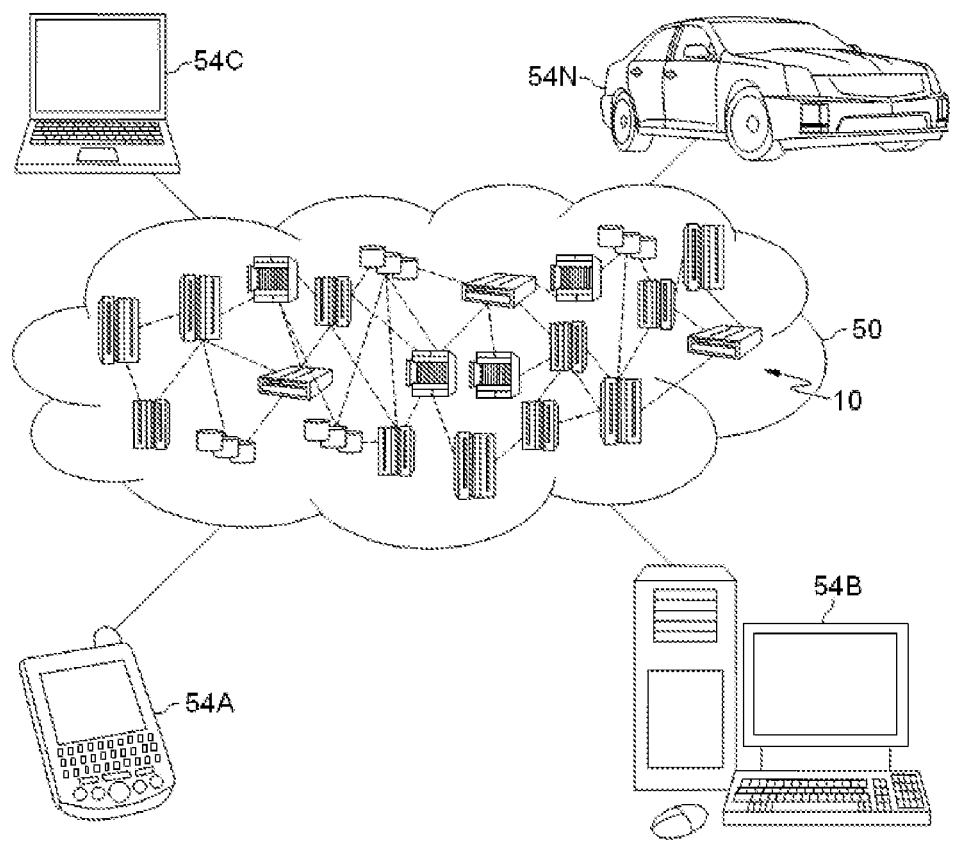
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
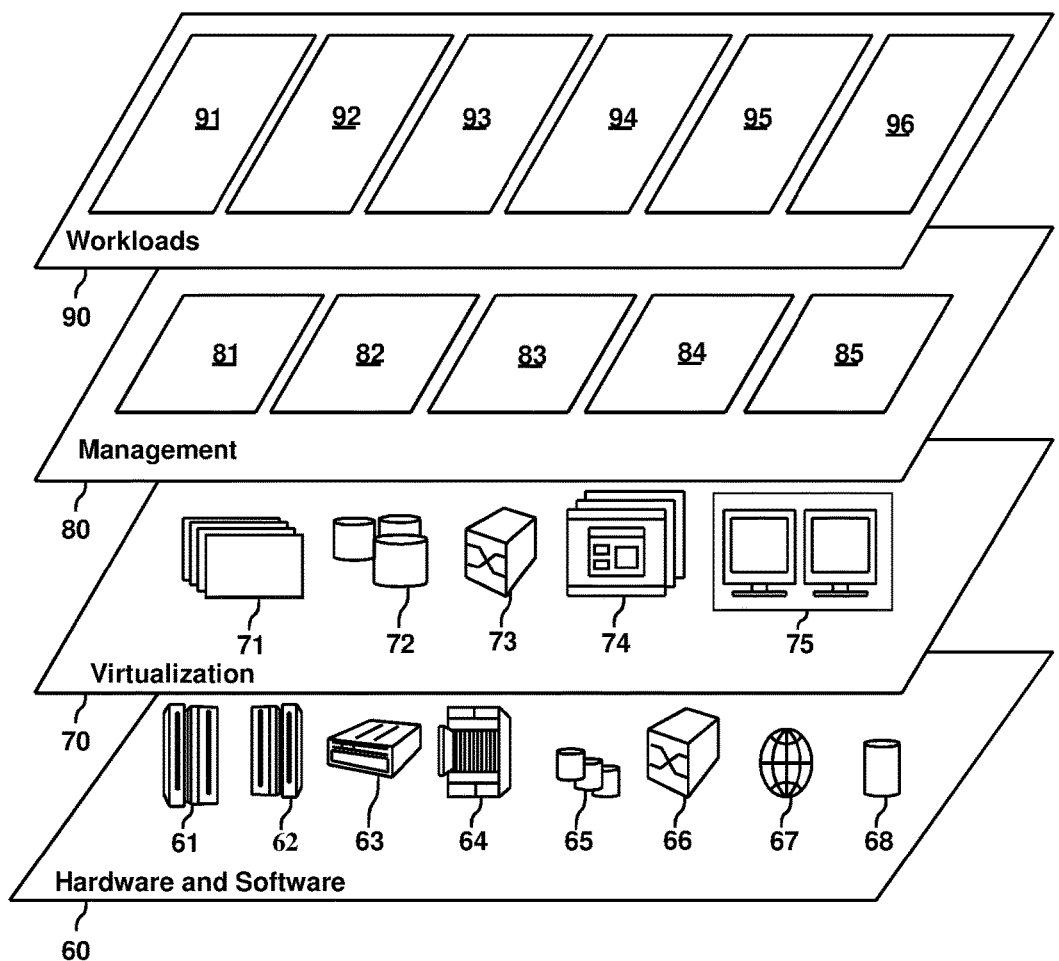
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and shooting parameters processing 96.

Nowadays, many people are fond of taking selfie photos. They usually use selfie sticks or UAV to facilitate photos taking. However, they usually cannot see the screen of the camera very clearly during capturing the photo. As a result, they have to take quite a lot of photos to select. Specifically, the current shooting angle for the user cannot be adjusted based on the user's preference and it cannot be improved during post-production. Further, if the user takes photos of other objects, for example, other people, animals or landscape, they may have similar problems. In order to solve at least part of the above problems, the present disclosure provides methods and devices for taking photos. For the purpose of illustration not limitation, embodiments of the present disclosure may be described with respect to taking selfie-photos. It to be understood that although the principles and spirits set forth herein with are with respect to selfie-photos, the present disclosure are not limited therein.

Figure 4:
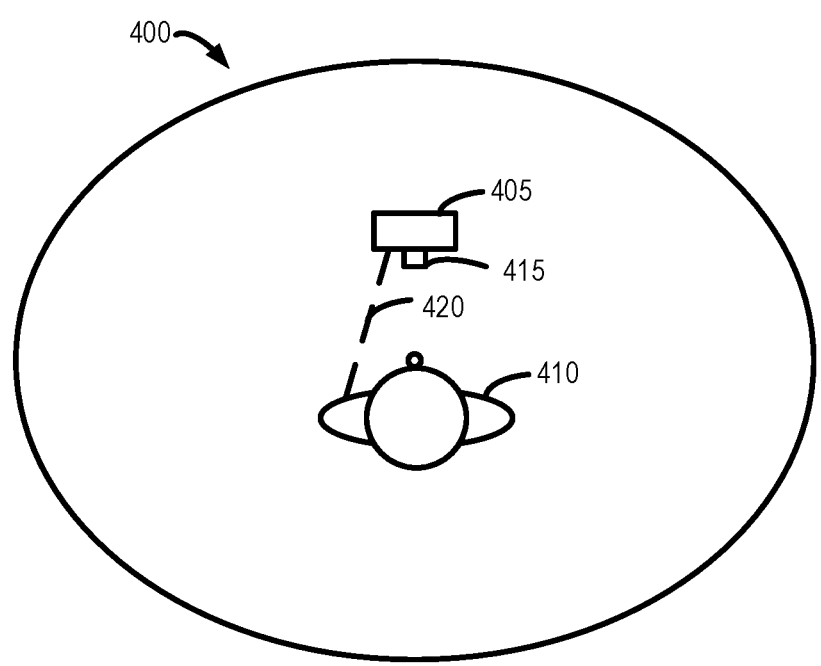
FIG. 4 shows a simplified block diagram of an environment where an embodiment of the present disclosure can be implemented.

FIG. 4 shows a simplified block diagram of an environment 400 where an embodiment of the present disclosure can be implemented. The environment 400 includes a camera 415 on an electronic device 405 which may be an example of the computer system/server 12 shown in FIG. 1 and an object 410. In some embodiments, the object 410 may be a user. Only for the convenience of illustration, the object and the user may be used interchangeably hereinafter. In some embodiments, the electronic device 405 may be connected to a selfie stick 420 which is optional or an unmanned aerial vehicle (UAV) (not shown). In some embodiments, the electronic device 405 may be connected to a cloud storage.

Conventionally, the electronic device does not facilitate the user to select a shooting parameter. The user may have to select a shooting parameter manually. Unlike conventional electronic devices, the electronic device 405 may intelligently select a shooting parameter for the user 410. In some embodiments, the electronic device 405 may be communicated with the selfie stick 420 or the UAV for facilitating photos taking based on the selected shooting parameter.

In an example embodiment, the communications between the electronic device 405 and the selfie stick 420 may conform to any suitable standards including, but not limited to, LTE-Advanced (LTE-A), LTE, Wideband Code Division Multiple Access (WCDMA), Code Division Multiple Access (CDMA), Global System for Mobile Communications (GSM), Bluetooth, Wi-Fi and the like. Furthermore, the communications may be performed according to any generation communication protocols either currently known or to be developed in the future. Examples of the communication protocols include, but are not limited to, the first generation (1G), the second generation (2G), 2.5G, 2.75G, the third generation (3G), the fourth generation (4G), 4.5G, the future fifth generation (5G) communication protocols. It should be appreciated that the number of the user 210 in FIG. 4 is only illustrative.

Operations and functionalities of embodiments of the present disclosure are now discussed with reference to FIG. 5 where a flowchart of a method 500 for intelligent selection of shooting parameter(s) is shown. The method 500 can be implemented by an electronic device 405 as shown in FIG. 4. It is to be understood that the blocks shown in dash line are optional.

In operation, the user 410 may take photos by operating the electronic device 405 or the selfie stick 420. In the case of selfie-photo, the user 410 needs to take a photo of him/her. Accordingly, at block 505, a user 410 to be taken is determined by a camera 415 of an electronic device 405. For example, determining the user 410 may be triggered in response to the user 410 lifting up the electronic device 405 or the selfie stick 420. Alternatively, the user 410 to be taken may be determined after the camera application is turned on by the user 410 or the user 410 inputs a command to execute the camera application. For example, if the camera 415 is turned on, it may automatically start to determine the user 410 to be taken by the camera 415. For ease of discussion, in the following paragraphs, the user 410 per se is described as an example of the object to be taken.

In some embodiments, by way of example, the user may be determined by recognizing a face of the user 410. The technology of facial recognizing is well-known in the art. Generally, a facial image detected by the camera 415 may be compared with facial information which is pre-stored in the electronic device 405 or in a remote storage accessible to the electronic device 405 to determine the user 410. That is, the electronic device 405 may match the facial image of the user 410 with a pre-stored facial image of the user. It is to be understood that embodiments of the present disclosure are not limited to facial recognition. For example, in some embodiments, an identity the user 410 to be taken may be determined by detecting a fingerprint of the user 410. Alternatively, the user 410 may be determined by detecting an iris of the user 410. In other embodiments, the user 410 may be determined by receiving an input from the user 410, for example a specific password or a vocal command In some embodiments, the electronic device 405 may match the identity with a pre-stored user's identify to determine the user 410. In some embodiment, the electronic device 405 may retrieve pre-stored photos that include the user 410 based on the identity. For example, the electronic device 405 may match the user 410 with the pre-stored photos that include a tag indicating the user 410, based on the identity of the user 410.

In other embodiments, the object may not be a person. For example, the object may be a dog. The object may be determined by any suitable means. By way of example, in an example embodiment, the object may be determined by machine vision. In a further example, the object may be determined by pattern recognition.

At block 510, at least one shooting parameter for the user 410 is determined based on at least one previous photo related to the user 410. As used herein, the term "shooting parameter" refers to a factor which has some influences on the process, effect and/or user satisfaction of the photo. Examples of shooting parameters include, but not limit to, a shooting angle, a brightness level, a focus distance and a filter. In some embodiments, the shooting parameters may be any combination of the shooting angle, the focus distance and the filter.

It to be understood that the shooting parameters are not limited to the above mentioned aspects and the shooting parameters may be any kinds of parameters that are associated with taking photos/videos. Taken the shooting angle as an example, a user may have a preferred shooting angle which ensures that photo meets the expectation of the user. Therefore, the shooting angle of the camera may directly affect the photos and the user's experience. For the purpose of illustration without limitation, the shooting angle will be discussed as an example in embodiments of the present disclosure hereinafter.

In some embodiments, one or more previous photos may include at least one photo related to the user 410, for example, the previous photo(s) including the user 410. By way of example, the photo(s) may include a tag which indicates a certain person and/or a certain object in the photo. For example, the tag of the photo may be "Alice" which indicates that the person "Alice" is in the photo. If the tag is "river", it means that the photo includes a river. In some embodiment, the tag(s) may be generated based on the user's input. Alternatively, or in addition, the tag(s) may be obtained by a technology which automatically recognize and process the photo(s).

Alternatively, or in addition, the one or more previous photos may be specified by the user 410. For example, the user 410 may select one or more photos which mostly satisfy the user 410's requirements so that the shooting parameter is determined based on the selected one or more photos. In other embodiments, the one or more previous photos may be online photos which may not include the user 410 so that the shooting parameters for the user 410 may be general parameters which are obtained using online big data.

In an example embodiment, the one or more previous photos may include a famous person. For example, the famous person may be specified by the user 410. In other embodiment, the electronic device 405 may randomly choose a photo of a famous person to be the previous photo.

In a further example embodiment, the one or more previous photos may include a person whose appearance is similar to the user 410. For example, in some embodiments, the person may have a similar face shape to the user 410. Alternatively, or in addition, positions of facial features of the person may be similar to the user 410. For example, the distance between eyes of the person is similar to the user 410. In some embodiments, the electronic device 405 may analyze facial features of the user 410 and facial features of persons in photos to determine the photo which include the person similar to the user 410.

The one or more previous photos may either be stored in the electronic device 405 or be stored in the remote storage accessible to the electronic device 405. For example, in an example embodiment, the remote storage may be a cloud storage accessible to the electronic device 405.

In some embodiments, the shooting parameter for the object may be optionally determined by analyzing a plurality of pre-stored photos including the object. As described above, the plurality of photos related to the user 410 may be pre-stored in the electronic device 405 or in a remote storage that can be accessed by the electronic device 405. For example, the most frequently used shooting angles may be determined based on the analysis of the shooting angles used in the plurality of previous photos. Alternatively, the most frequently used filter may be determined based on the analysis of the filters used in the plurality of previous photos.

In some embodiments, if the number of the pre-stored photos including a user is less than a predetermined value, the shooting parameters for the user may not be obtained based on analysis but may be obtained from online photos using online big data. The plurality of photos related to the user 410 may be analyzed periodically to determine the shooting parameters for the user 410. In another embodiment, the plurality of photos related to the user 410 may be analyzed after the user 410 is determined at block 505.

In an example embodiment, the plurality of photos may be grouped based on brightness levels of the plurality of previous photos. A plurality of shooting parameters related to the respective brightness levels are determined based on the different groups. As another example, the plurality of photos may be divided into different groups based on other factors such as filters. In these embodiments, the plurality of photos may be divided into different groups based on filters of the plurality of photos and a plurality of shooting parameters associated with the respective filters may be determined based on the groups. By way of example, the plurality of shooting parameters associated with the respective brightness levels may be determined in the same way as described above. That is, the plurality of shooting parameters associated with the respective brightness levels may be determined by analyzing a plurality of photos having the same brightness level.

In some embodiments, the determined shooting parameters for the user 410 may be stored in a local storage. Alternatively, or in addition, in some embodiments, the determined shooting parameters for the user 410 may be stored in a remote storage accessible to the electronic device 405.

In an embodiment, there may be a plurality of photos related to different users and the plurality of photos may be classified based on different users. In this embodiment, the shooting parameters for each different user may be determined by analyzing a plurality of photos of each different user and the shooting parameters associated with the respective users may be stored.

In some embodiments, the electronic device 405 may determine that there is more than one person to be taken. By way of example, if the electronic device 405 determines that there are two users, for example, the user 410 and other user (not shown), the electronic device 405 may determine the user 410 as the target user. In an example embodiment, if the electronic device 405 detects that the user 410 occupy more area in the lens of the camera 415, the user 410 may be determined as the target user. In another embodiment, if the electronic device 405 detects that the user 410 is at the middle position of the camera 415, the electronic device 405 may determine the user 410 as the target user. Alternatively, or in addition, if the electronic device 405 determined that the number of photos including the user 410 stored in the electronic device is more than the number of photos including the other user, the electronic device 405 may determine the user 410 as the target user.

Figure 5:
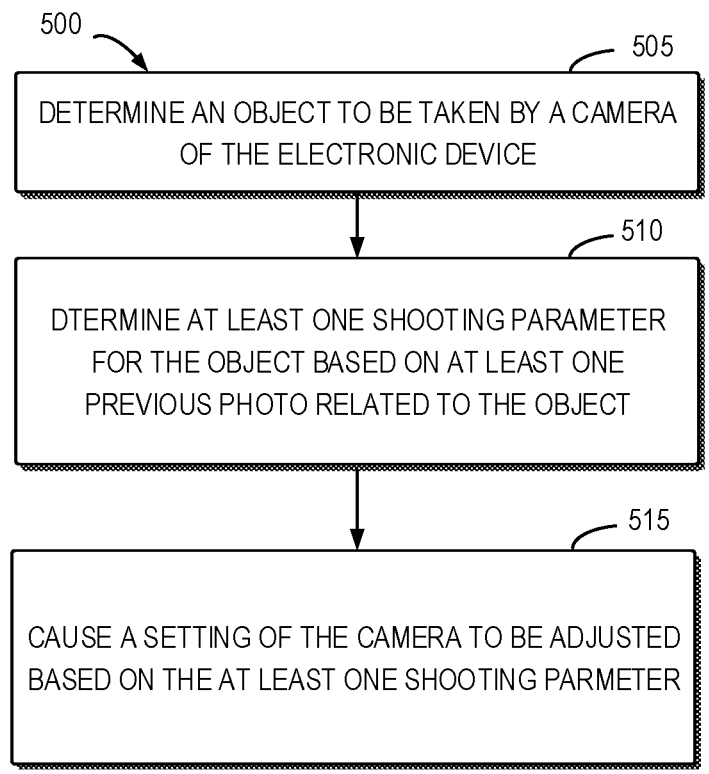
FIG. 5 shows a flowchart of a method according to an embodiment of the present disclosure.

The shooting parameter of the user 410 may be determined by the method shown in FIG. 5 and the shooting parameter of the user 410 may be used as the shooting parameter for these two users, namely, the user 410 and the other user. In other embodiments, the electronic device 405 may determine the shooting parameter for the user 410 and the shooting parameter for the other user respectively and the electronic device 405 may determine a compromising shooting parameter for these two users based on their respective shooting parameters.

In a further embodiment, the electronic device 405 may take two users, for example user 410 and other user (not shown), as a whole to determine the shooting parameter. By way of example, the electronic device 405 may determine the shooting parameter for the two users based on a previous photo including these two users. The electronic device 405 may also determine the shooting parameter for the two users using an on-line photo which may include two persons.

In some embodiments, the stored shooting parameters may be retrieved based on the user 410 to determine the shooting parameter for the user 410. By way of example, Table 1 below shows an example that the shooting parameters for different users may be stored associated with different brightness levels. Details of retrieving shooting parameters stored in Table 1 will be explained in the following paragraphs.

TABLE 1

| User A | Brightness Level A1 | Shooting Parameter A1-1 |
| | | Shooting Parameter A1-2 |
| | Brightness Level A2 | Shooting Parameter A2-1 |
| | | Shooting Parameter A2-2 |
| User B | Brightness Level B1 | Shooting Parameter B1-1 |
| | | Shooting Parameter B1-2 |
| | Brightness Level B2 | Shooting Parameter B2-1 |
| | | Shooting Parameter B2-2 |

Figure 6:
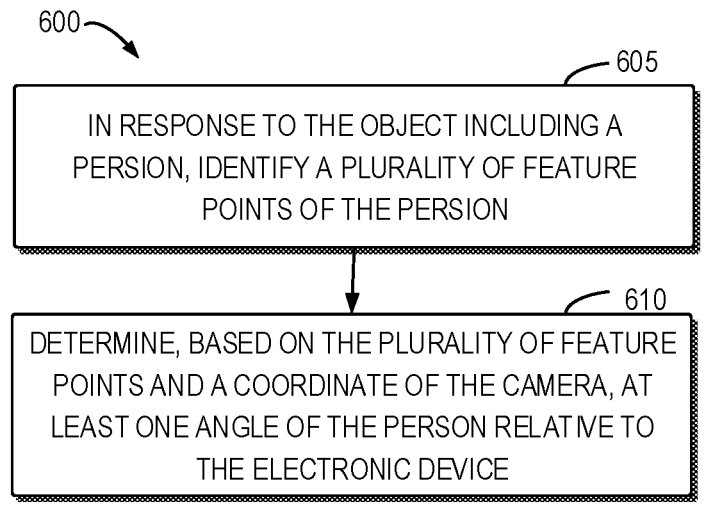
FIG. 6 shows a flowchart of a method according to an embodiment of the present disclosure.

FIG. 6 illustrates an example method 600 implemented at the block 510 as shown in FIG. 5. The method 600 may be implemented by the electronic device 405 as shown in FIG. 4. The method 600 will be described with reference to FIGS. 7A-7D.

Figure 7A:
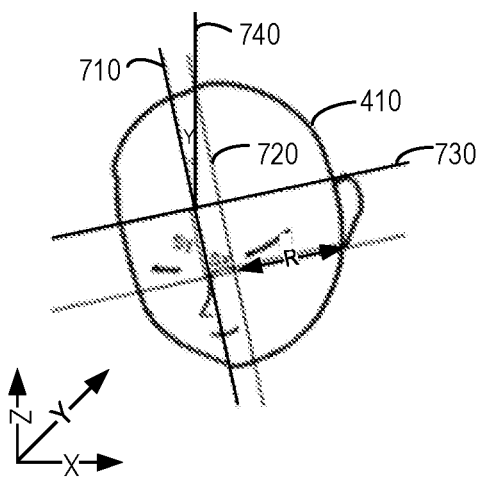
FIGS. 7A-7D show example diagrams of shooting angles according to an embodiment of the present disclosure.

An example of a photo including the user 410 is shown in FIG. 7A. As illustrated in FIG. 7A, the user 410 in the photo has a certain pose relative to the camera 415 of the electronic device 405. It to be understood that the user 410 and the camera 415 of the electronic device 405 have relative poses. That is to say, the pose of the user 410 in a coordinate of the camera 415 and the pose of the camera 415 in a coordinate of the user 410 may be interchangeable.

Referring to FIG. 6, at block 605, a plurality of feature points on a body of the user 410 are identified. Examples of the feature points include, but are not limited to, a root of a nose, a middle point of the lip, and the like. In another embodiment, the feature points may include the root of the nose and tops of ears. It is to be understood that the feature points are not limited to the above examples. For example, the features points may be a top of eyebrows.

Figure 7B:
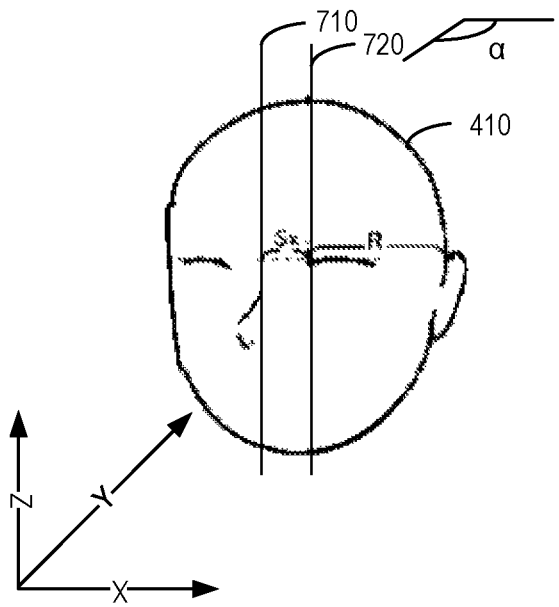
Figure 7C:
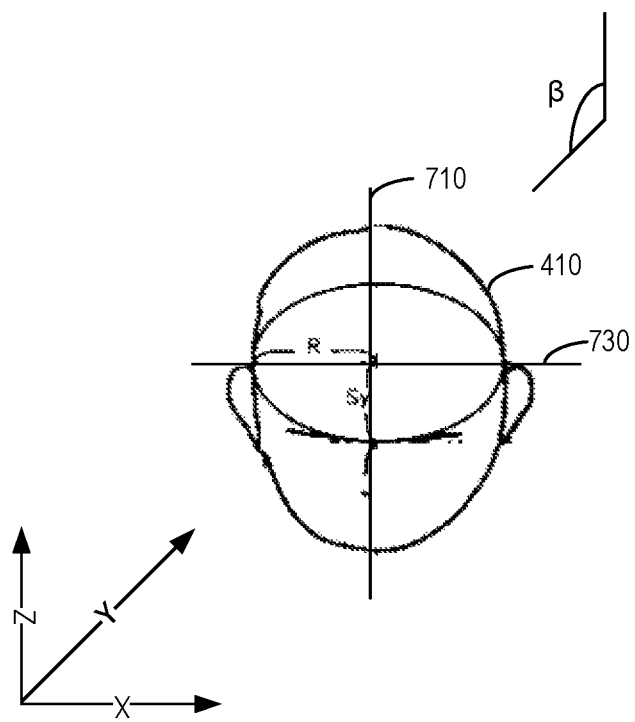
Figure 7D:
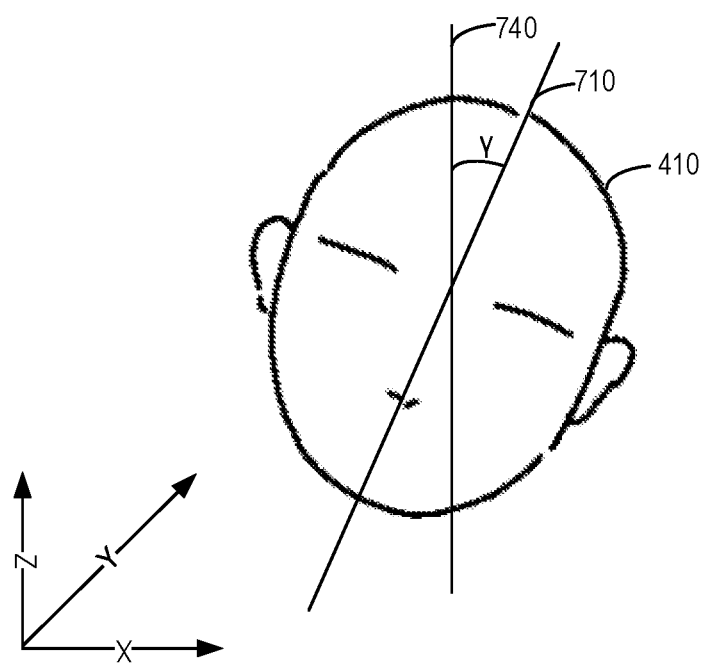

At block 610, at least one angle of the object relative to the electronic 405 is determined based on the plurality of feature points and a coordinate of the camera 415. In an example embodiment, the angle may be a horizontal rotational angle α as shown in FIG. 7B. In another embodiment, the angle may be a vertical rotational angle β as shown in FIG. 7C. In a further embodiment, the angle may be a parallel rotational angle γ as shown in FIG. 7D. In some embodiments, as shown in FIGS. 7A-7D, line 710 may be the line that connects the root of the nose with the middle of the lips. Line 720 may be the line that equally divides the head of the user 410 from left to right. Line 730 may be the line that goes through top of the ears and is vertical to line 720. Line 740 may be a vertical reference line of the photo. The parameter R may be a radius of the user 410's head.

By way of example, FIGS. 7A-7D illustrate example embodiments of determining different angles of the user relative to the electronic device 405. As shown in FIG. 7B, the horizontal rotational angle α of the user 410 relative to the camera 415 in the coordinate of the camera 415 may be determined as follows.

$$\alpha = arc \sin (Sx/R) \quad (1)$$

where Sx represents the distance from the root of the nose to line 710, R represents the radius of the user 410's head and arc sin represents the inverse trigonometric function of sine.

As shown in FIG. 7C, the vertical rotational angle β of the user 410 relative to the camera 415 in the coordinate of the camera 415 may be determined as follows.

$$\beta = arc \sin (Sy/R) \quad (2)$$

where Sy represents the distance from the root of the nose to line 730, R represents the radius of the user 410's head and arc sin represents the inverse trigonometric function of sine.

As shown in FIG. 7D, the parallel rotational angle γ of the user relative to the camera 415 may be determined directly. In some embodiments, the pose of the electronic device 405 relative to the object is determined based on the at least one angle. By way of example, the pose of the user 410 relative to the electronic device 405 may be determined based on one or more of angles α, β and γ. As mentioned above that the pose of the user 410 in a coordinate of the camera 415 and the pose of the camera 415 in a coordinate of the user 410 may be interchangeable, the pose of the electronic device 405 relative to the user 410 may be determined based on one or more of angles α, β and γ. In this way, the shooting parameters for the user 410 may be determined in real time. By way of example, in a Cartesian coordinate of the user 410 where the user's head is the original point, the Cartesian coordinate point of the electronic device 405 is (x, y, z). In some embodiments, the values of x, y and z may be determined as follows.

$$x = R^* \cos \beta^* \cos \alpha \quad (3)$$

$$y = R^* \cos \beta^* \sin \alpha \quad (4)$$

$$z = R^* \sin \beta \quad (5)$$

where x represents the position of the electronic device 405 on the X axis of the Cartesian coordinate, y represents the position of the electronic device 405 on the Y axis of the Cartesian coordinate and z represents the position of the electronic device 405 on the Z axis of the Cartesian coordinate. R represents the radius of the user 410's head, α represents the horizontal rotational angle and β represents the vertical rotational angle.

Although FIGS. 7A-7D illustrate the example embodiments that may obtain shooting angles as the shooting parameters, it to be understood that other shooting parameters such as filters may be obtained for the user 410 using possible implementations. The present disclosure is not limited in this aspect.

As stated above, in some embodiments, the electronic device 405 may determine that there is more than one person to be taken. In some embodiments, the shooting parameters for the persons may be determined by the method described in FIGS. 7A-7D. The shooting parameters may be grouped based on different objects.

Referring back to FIG. 5, at block 515, a setting of the camera 415 may be caused to be adjusted based on the at least one parameter. For example, the setting may include a pose of the camera 415 relative to the object. Alternatively, or in addition, the setting may include a distance from the camera 415 to the object. It is to be understood that the distance from the camera 415 to the object may be determined by any suitable methods. For example, the electronic device 405 may determine the distance by transmitting and receiving a pulse signal. Alternatively, the distance of the electronic device 405 may be adjusted to take photos at the focus distance obtained at block 510.

In some embodiments, a current angle of the object relative to the electronic device may be determined. The current angle of the object relative to the electronic device may be determined using the method described with respect to FIG. 6 and FIGS. 7A-7D.

In some embodiment, the setting of the camera 415 may be caused to be adjusted based on a difference between the previous angle and the current angle. In an example embodiment, the previous angle and the current angle may be determined by the method described with respect to FIG. 6 and FIGS. 7A-7D. For example, if the previous angle and the current angle have been determined, the electronic device 405 may determine the difference between the previous angle and the current angle. The electronic device 405 may cause the camera 415 to be adjusted in order to match the current angle with the previous angle. In some embodiments, the previous angle may be determined from pre-stores photos using the method described in FIGS. 7A-7D. In some embodiments, the current angle may be determined from real-time images of the user 410 in the camera using the method described in FIGS. 7A-7D.

In an example embodiment, where the electronic device 405 is connected to the selfie stick 420, the electronic device 405 may communicate with the selfie stick 420 to adjust the electronic device 405 based on the determined shooting parameter. For example, the electronic device 405 may indicate the selfie stick 420 to extend or shrink its length to adjust the distance of the electronic device 405 relative to the user 410. Alternatively, the electronic device 405 may indicate the selfie stick 420 to rotate the electronic device 405 to adjust the pose of the electronic device 405 relative to the user 410. In other embodiment, the electronic device 405 may indicate the selfie stick 420 to change its length and rotate the electronic device 405 to adjust both the distance and the pose of the electronic device 405.

In a further example embodiment, the electronic device 405 may output, via its user interface, a visual, audible and/or vibratile indication to the user 410 to adjust the electronic device 405 based on the obtained shooting parameter. The indication may be in any suitable form. For example, the indication may be in form of a text message. The indication may also be in form of a vocal message. Alternatively, the indication may be in form of an image to illustrate operations of adjusting the electronic device 405. By way of example, the electronic device 405 may output a vocal indication to the user 410 to indicate how the electronic device 405 should be rotated to adjust the pose. Alternatively, the electronic device 405 may indicate the user 410 how far the electronic device 405 should be away from the user 410 to adjust the distance.

In an additional example embodiment, the electronic device 405 may indicate the user 410 to select adjusting the electronic device 405 manually or adjusting the electronic device 405 automatically through the selfie stick 420 based on the obtained shooting parameter.

In some embodiments, the shooting parameters for the user 410 may be determined at block 510 and the current shooting parameter for the user 410 may also be determined according to embodiments implemented at block 510. In some of these embodiments, the pose of the electronic device 405 relative to the user 410 may be caused to adjust based on the shooting parameter obtained at bock 510. In other embodiments, the distance of the electronic device 405 relative to the user 410 may be caused to adjust based on the shooting parameter obtained at block 510. Alternatively, both of the pose and the distance relative to the user 410 may be adjusted. In this way, the user 410 does not need to focus on the screen and the camera will automatically move to a best angle and distance.

In some embodiments, the electronic device 405 may communicate with a selfie stick 420 or a UAV (not shown) to facilitate the pose and/or the distance of the electronic device 405 relative to the user 410 to be adjusted. In this way, the current shooting parameter for the user 410 may be automatically adjusted to match the shooting parameter determined at block 510. In other embodiments, the electronic device 405 may send information regarding the obtained shooting parameter to the user 410 to facilitate the electronic device 405.

In some embodiments, a current brightness level of an environment 400 where the user 410 is located is determined. In this embodiment, the shooting parameter associated with a brightness level matching the current brightness level may be obtained from a plurality of predetermined shooting parameters.

By way of example, an embodiment will be described with reference to the method described above for the purpose of illustration not limitation. In this example, by way of example, the shooting parameter refers to shooting angle. The user 410 may be determined at block 505 and the brightness level of the current environment 400 may be determined as well. For example, the user 410 may be User A and the current brightness level may be A1. The current rotational angles of the user 410 may be α1, β1 and γ1 which may be determined based on the above formulas (1) and (2) at block 610.

As shown above in Table 1, the shooting parameters for different users may be determined based on one or more photos including the user 410 and may be stored associated with different brightness levels. In this embodiment, as the user 410 may be User A and the brightness level may be A1, possible shooting parameters for obtaining may be shooting parameter A1-1 and shooting parameter A1-2. The shooting parameter A1-2 may be retrieved as the determined parameter. In this embodiment, the shooting parameter A1-2 may correspond to the shooting angle (α2, β2, γ2). The current Cartesian coordinate point (x1, y1, z1) of the electronic device 405 may be determined based the current shooting angle (α1, β1, γ1) and the above formulas (3)-(5). In this embodiment, the current Cartesian coordinate point (x1, y1, z1) may be determined as follow.

$$x1 = R^* \cos \beta 1^* \cos \alpha 1 \quad (6)$$

$$y1 = R^* \cos \beta 1^* \sin \alpha 1 \quad (7)$$

$$z1 = R^* \sin \beta 1 \quad (8)$$

where x1 represents the current position of the electronic device 405 on the X axis of the Cartesian coordinate, y1 represents the current position of the electronic device 405 on the Y axis of the Cartesian coordinate and z1 represents the current position of the electronic device 405 on the Z axis of the Cartesian coordinate. R represents the radius of the user 410's head, α1 represents the current horizontal rotational angle and β1 represents the current vertical rotational angle.

The target Cartesian coordinate point (x2, y2, z2) of the electronic device 405 may be determined based on the obtained shooting angle (α2, β2, γ2) and the above formulas (3)-(5). In this embodiment, the target Cartesian coordinate point (x2, y2, z2) may be determined as follows.

$$x2 = R^* \cos \beta 2^* \cos \alpha 2 \quad (9)$$

$$y2 = R^* \cos \ominus 2^* \sin \alpha 2 \quad (10)$$

$$z2 = R^* \sin \beta 2 \quad (11)$$

where x2 represents the target position of the electronic device 405 on the X axis of the Cartesian coordinate, y2 represents the target position of the electronic device 405 on the Y axis of the Cartesian coordinate and z2 represents the target position of the electronic device 405 on the Z axis of the Cartesian coordinate. R represents the radius of the user 410's head, α2 represents the target horizontal rotational angle and β2 represents the target vertical rotational angle.

In some embodiments, the obtained parameters are those most similar to the current parameters from a plurality of pre-determined parameters. In this embodiment, based on the current Cartesian coordinate point and the target Cartesian coordinate of the electronic device 405, the movements of different directions may be determined. By way of example, the distance between the current point and the target point is (Δx, Δy, Δz), where Δx=x1−x2, Δy=y1−y2 and Δz=z1−z2. In other words, the electronic device 405 may be rotated on x axis by α3 and may be rotated on y axis by β3 and then the electronic device 405 may be moved by γ3. In this embodiment, the rotated angles in different directions the may be determined as follow.

$$\alpha 3 = arc \tan (\Delta y / \Delta z) \quad (12)$$

$$\beta 3 = arc \tan(\Delta z / \sqrt{\Delta x^2 + \Delta y^2}) \quad (13)$$

$$\gamma 3 = \sqrt{\Delta x^2 + \Delta y^2 + \Delta z^2} \quad (14)$$

where α3 represents the rotated angle in horizontal, β2 represents the rotated angle in vertical and γ3 represents the rotated angle in parallel. Δx represents the distance between current point and the target point on X axis of the Cartesian coordinate, Δy represents the distance between current point and the target point on Y axis of the Cartesian coordinate, and Δz represents the distance between current point and the target point on Z axis of the Cartesian coordinate.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    determining, by an electronic device, an object to be taken by a camera of the electronic device;
    determining, by the electronic device, at least one shooting parameter for the object based on at least one previous photo related to the object, wherein determining, by the electronic device, the at least one shooting parameter for the object comprises:
        in response to the object including a plurality of persons, selecting, by the electronic device, at least one person from the plurality of persons as a target person, and determining, by the electronic device, the at least one shooting parameter in association with the target person; and causing, by the electronic device, a setting of the camera to be adjusted based on the at least one shooting parameter.

2. The method of claim 1, wherein causing, by the electronic device, a setting of the camera to be adjusted comprises:

causing, by the electronic device, a pose of the camera relative to the object to be adjusted.

3. The method of claim 1, wherein determining, by the electronic device, at least one shooting parameter for the object further comprises:

determining, by the electronic device, a previous angle of the object relative to the electronic device based on the at least one previous photo; and wherein causing, by the electronic device, a setting of the camera to be adjusted comprises:

determining, by the electronic device, a current angle of the object relative to the electronic device; and causing, by the electronic device, the setting of the camera to be adjusted based on a difference between the previous angle and the current angle.

4. The method of claim 3, wherein at least one of the previous angle and the current angle is determined by:

in response to the object including a person, identifying, by the electronic device, a plurality of feature points of the person, the plurality of feature points including at least one of the following:

a first group consisting of a root of a nose and tops of ears of the person, and a second group consisting of the root of the nose and a middle of a lip of the person; and determining, by the electronic device, based on the plurality of feature points and a coordinate of the camera, at least one angle of the person relative to the electronic device.

5. The method of claim 1, wherein the at least one previous photo related to the object comprises at least one of:

a photo including a first object, a similarity between the first object and the object being above a predetermined threshold, or a photo including a second object recognized to be a predetermined object.

6. The method of claim 1, wherein determining, by the electronic device, the at least one shooting parameter for the object further comprises:

grouping, by the electronic device, the at least one previous photo related to the object based on brightness levels of the at least one previous photo related to the object;

determining, by the electronic device, a plurality of shooting parameters associated with the respective brightness based on the grouping;

determining, by the electronic device, a current brightness level of an environment in which the object is located; and determining, by the electronic device, from the plurality of shooting parameters, the shooting parameters associated with the brightness levels matching with the current brightness level.

7. The method of claim 1, wherein causing, by the electronic device, a setting of the camera to be adjusted comprises:

causing, by the electronic device, a distance from the camera to the object to be adjusted.

8. A system, comprising an electronic device coupled to a computer-readable memory unit, the memory unit comprising instructions that when executed by the electronic device implement a method comprising:

determining an object to be taken by a camera of the electronic device;

determining at least one shooting parameter for the object based on at least one previous photo related to the object, wherein determining, by the electronic device, the at least one shooting parameter for the object comprises:

in response to the object including a plurality of persons, selecting, by the electronic device, at least one person from the plurality of persons as a target person, and determining, by the electronic device, the at least one shooting parameter in association with the target person; and causing a setting of the camera to be adjusted based on the at least one shooting parameter.

9. The system of claim 8, wherein causing a setting of the camera to be adjusted comprises:

causing a pose of the camera relative to the object to be adjusted.

10. The system of claim 8, wherein determining at least one shooting parameter for the object further comprises:

determining a previous angle of the object relative to the electronic device based on the at least one previous photo; and wherein causing a setting of the camera to be adjusted comprises:

determining a current angle of the object relative to the electronic device; and causing the setting of the camera to be adjusted based on a difference between the previous angle and the current angle.

11. The system of claim 10, wherein at least one of the previous angle and the current angle is determined by:

in response to the object including a person, identifying a plurality of feature points of the person, the plurality of feature points including at least one of the following:

a first group consisting of a root of a nose and tops of ears of the person, and a second group consisting of the root of the nose and a middle of a lip of the person; and determining, based on the plurality of feature points and a coordinate of the camera, at least one angle of the person relative to the electronic device.

12. The system of claim 8, wherein the at least one previous photo related to the object comprises at least one of:

a photo including a first object, a similarity between the first object and the object being above a predetermined threshold, or a photo including a second object recognized to be a predetermined object.

13. The system of claim 8, wherein determining the shooting parameter for the object comprises:

grouping the at least one previous photo related to the object based on brightness levels of the at least one previous photo related to the object;

determining a plurality of shooting parameters associated with the respective brightness based on the grouping;

determining a current brightness level of an environment in which the object is located; and determining, from the plurality of shooting parameters, the shooting parameters associated with the brightness levels matching with the current brightness level.

14. A computer program product being tangibly stored on a non-transient machine-readable medium and comprising machine-executable instructions, the instructions, when executed on an electronic device having a camera, causing the electronic device to:
- determine an object to be taken by the camera;
- determine at least one shooting parameter for the object based on at least one previous photo related to the object, wherein the instructions to determine the at least one shooting parameter for the object comprise;
  - instructions to, in response to the object including a plurality of persons, select at least one person from the plurality of persons as a target person, and
  - instructions to determine the at least one shooting parameter in association with the target person; and
- cause a setting of the camera to be adjusted based on the at least one shooting parameter.

15. The computer program product of claim 14, wherein the instructions, when executed on an electronic device having a camera, cause the electronic device to:
- cause a pose of the camera relative to the object to be adjusted.

16. The computer program product of claim 14, wherein the instructions to determine the at least one shooting parameter for the object comprise instructions to:
- determine a previous angle of the object relative to the electronic device based on the at least one previous photo, and
- wherein the instructions, when executed on an electronic device having a camera, cause the electronic device to:
  - determine a current angle of the object relative to the electronic device; and
  - cause the setting of the camera to be adjusted based on a difference between the previous angle and the current angle.

17. The computer program product of claim 16, wherein at least one of the previous angle and the current angle is determined by:
- in response to the object including a person, identifying a plurality of feature points of the person, the plurality of feature points including at least one of the following:
  - a first group consisting of a root of a nose and tops of ears of the person, and
  - a second group consisting of the root of the nose and a middle of a lip of the person; and
- determining, based on the plurality of feature points and a coordinate of the camera, at least one angle of the person relative to the electronic device.

18. The computer program product of claim 14, wherein the at least one previous photo related to the object comprises at least one of:
- a photo including a first object, a similarity between the first object and the object being above a predetermined threshold, or
- a photo including a second object recognized to be a predetermined object.

19. The computer program product of claim 14, wherein the instructions to determine the at least one shooting parameter for the object comprise instructions to:
- group the at least one previous photo related to the object based on brightness levels of the at least one previous photo related to the object;
- determine a plurality of shooting parameters associated with the respective brightness based on the grouping;
- determine a current brightness level of an environment in which the object is located; and
- determine, from the plurality of shooting parameters, the shooting parameters associated with the brightness levels matching with the current brightness level.

* * * * *